ically

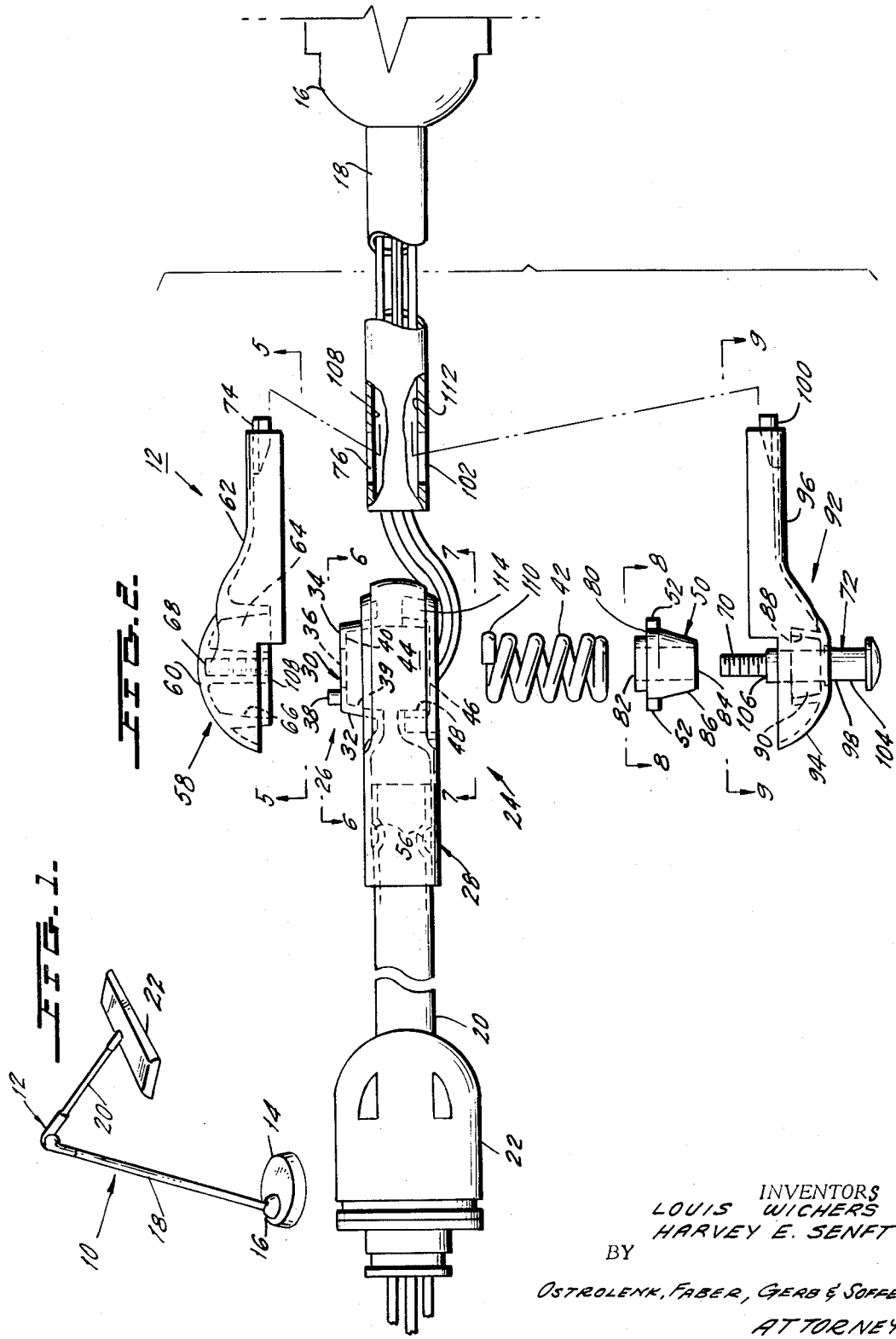

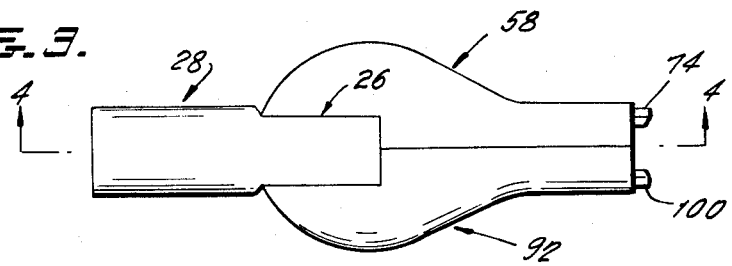
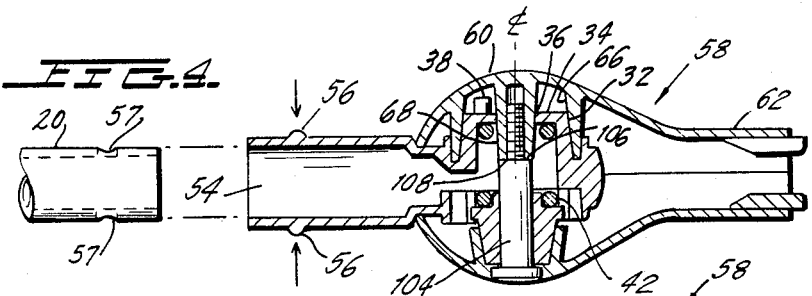
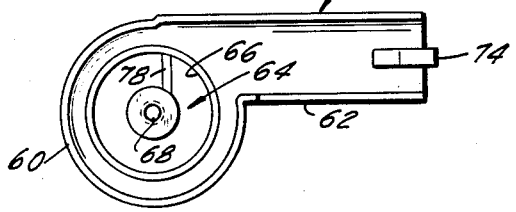
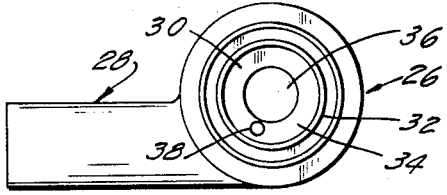
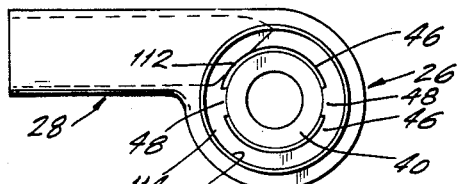
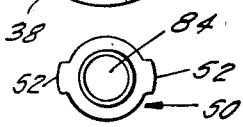
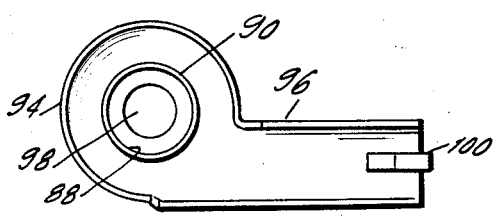

United States Patent Office 3,409,315
Patented Nov. 5, 1968

3,409,315
SWIVEL JOINT
Louis Wichers, Nyack, and Harvey E. Senft, White Plains, N.Y., assignors to Swivelier Company, Inc., Nanuet, N.Y., a corporation of New York
Filed May 17, 1966, Ser. No. 550,676
10 Claims. (Cl. 285—175)

ABSTRACT OF THE DISCLOSURE

A swivel joint of the type having particular applicability in conjunction with electrical fixtures, which includes a pair of outwardly extending frusto-conical surfaces in engagement with a pair of complementary internal frusto-conical surfaces sandwiched thereabout. A biasing means in the form of an expansion type spring member is located intermediate the exterior conical surfaces, for urging such surfaces apart into firm frictional engagement with their complementary surfaces and thereby restrain the selected angular disposition of the swivel joint.

---

This invention relates to a swivel joint, particularly suitable for use in connection with the load bearing arm of a lighting fixture, and more particularly relates to an improved swivel joint which, because of the reduction in the number of parts, is simple and inexpensive to manufacture, while at the same time provides improved operating characteristics over the swivel joints available in the prior art.

Heretofore, it has been a problem to provide a lighting fixture swivel joint which will carry large loads on relatively long arms and at the same time be readily adjustable by the user but firm enough so as not to be displaced by the weight of the load, especially when such loads are attached to relatively long supporting arms.

Various solutions to this problem have been proposed, but each solution has generally required a complex swivel joint requiring an extremely large number of accurately machined parts, which for the most part may only be properly assembled by relatively skilled personnel; the overall result being that the prior art swivel joints, although in some cases capable of performing the required function, are prohibitive in cost. An example of such a swivel joint may be seen in FIGURES 4–6 of United States Patent 2,925,294 issued Feb. 16, 1960 to N. R. Schwartz.

In contradistinction to the complex swivel joints prevalent in the prior art, the instant invention provides an improved swivel joint comprised of a drastically reduced number of basically simple parts which may be easily assembled by relatively unskilled personnel. In addition to reducing the complexity and cost involved, it has been found that a swivel joint constructed in accordance with the teachings of the instant invention has improved operating characteristics over swivel joints of the prior art.

In its preferred embodiment a swivel joint of the instant invention comprises only six parts, which is to be contrasted with as many as nineteen parts for swivel joints of the prior art which perform the same function. In accordance with the invention the high frictional forces which are required to maintain the load bearing arm of the lighting fixture in the position preset by the user, are developed between two sets of frictionally engaged mating surfaces.

Specifically, there is provided a central member to which one of the pipes or rods of the arm assembly of a lighting fixture is rigidly secured. Integrally disposed on one side of such central member there is provided a tapered protrusion which is frictionally received within a tapered cavity provided in a rotatable shell member to which the second pipe or rod of the arm assembly is rigidly secured.

On the opposite side of the central member is provided a conically shaped bearing member which is biased by spring means interposed between the protrusion and bearing member to frictionally engage a similarly tapered recess provided on a second rotatable shell-like member which is similarly secured to the second pipe of the arm assembly.

The shells, disposed on opposite sides of the central member, are drawn together against the bias of the interposed spring by fastening means such as a screw which passes through the bearing member, the spring and the protrusion of the central member whereby the conically-tapered bearing member and the protrusion are firmly and frictionally telescopically seated within their mating cavities, and such that the fastening member passing centrally through the entire arrangement becomes the pivoting axis therefor. As noted above, it has been found that the high frictional forces developed between the two pairs of tapered mating surfaces described above are greater than the frictional forces developed in the complex arrangements of the prior art and hence a swivel joint constructed in accordance with the instant invention is capable of supporting a greater moment arm than was possible previously.

It is a particularly advantageous feature of the instant invention that the compression spring utilized to separate the conically shaped bearing member and protrusion resides within a recess defined by the interior surfaces of the protrusion which extends from the central member thereby compactly reducing the overall size and weight of the swivel joint.

As a further feature, the recess which receives the spring is provided with a walled surface having a pair of spaced apart notches therein, and the conically shaped bearing member which seats against one end of the spring, is provided with a pair of laterally extending ears which seat in such notches to prevent relative rotational movement between the bearing member and the protrusion, while at the same time permitting relative longitudinal motion therebetween in response to the expansion of the spring disposed therebetween.

As a further feature of the instant invention, the two shell-like exterior members each include semi-cylindrical neck portions which, when mated, form a pipe receiving recess within which the second pipe of the arm assembly may be rigidly retained, for example, by means of internally disposed ears integrally provided on the internal surfaces of the neck portion. The securement of the two-shell-like members to one another, first by means of the fastening member passing centrally through the swivel joint, and secondly by means of the internally located ears provided on the mating semi-cylindrical surfaces, assures that there will be no relative rotation between the two shell-like members and may be considered as a single, integral unit.

Accordingly, it is an object of the instant invention to provide an improved swivel joint comprised of a relatively few number of simple parts, easily assembled by relatively unskilled personnel.

It is another object of the instant invention to provide such a swivel joint which while reducing size, weight and cost of manufacture, at the same time has improved operating characteristics over the relatively complex swivel joints of the prior art.

Still another object of the instant invention is to provide such a swivel joint which includes a first member having a protrusion disposed on a first side thereof, a second shell-like member rotatable relative to the first member and having a protrusion receiving cavity which receives the protrusion of the first member, and biasing means for urging the protrusion into tight-frictional engagement with the cavity of the shell-like member.

Still another object of the instant invention is to provide an improved swivel joint wherein the various cooperating pairs of mating surfaces are tapered to facilitate the greatest cross-sectional area of engagement and thereby increase the frictional forces developed therebetween.

Still another object of the instant invention is to provide such a swivel joint wherein the biasing means utilized to urge a pair of tapered surfaces in opposite directions, is seated within one of such tapered surfaces, thereby compacity reducing the size of the overall arrangement.

Yet another object of the instant invention is to provide such a swivel joint wherein the pair of oppositely disposed tapered surfaces which are urged in opposite direction by an interposed spring are provided with an interlock arrangement which prevents relative rotational movement therebetween.

Still another object of the instant invention is to provide such a swivel joint wherein the spring utilized to develop the frictional forces between the pairs of mating tapered surfaces is disposed on an axis common to such tapered surfaces to thereby develop maximum spring forces in the direction which increases friction.

Yet another object of the instant invention is to provide such a swivel joint wherein the oppositely disposed shell-like members thereof are rigidly joined along two points thereof so as to prevent relative rotation therebetween.

Other objects and a fuller understanding of the instant invention may be had by referring to the following specification and drawings, in which:

FIGURE 1 is a perspective view of a lamp in which the swivel joint of the instant invention may be utilized;

FIGURE 2 is an exploded plan view, partially, in section, illustrating the cooperation of the component parts of the instant invention;

FIGURE 3 is a plan view of a portion of FIGURE 2 in its assembled state;

FIGURE 4 is a cross-sectional view of FIGURE 3, taken along the arrows 4—4 thereof;

FIGURE 5 is a view taken alnog the arrows 5—5 of FIGURE 2;

FIGURE 6 is a view taken along the arrows 6—6 of FIGURE 2;

FIGURE 7 is a view taken along the arrows 7—7 of FIGURE 2;

FIGURE 8 is a view taken along the arrows 8—8 of FIGURE 2; and

FIGURE 9 is a view taken along the arrows 9—9 of FIGURE 2.

Referring to FIGURE 1, there is shown a lamp 10 in which a swivel joint 12 constructed in accordance with the teachings of the instant invention may be employed. It is to be understod, however, that although the swivel joint of the instant invention will be specifically described with respect to a lamp fixture, it could be equally as well applied to any environment or situation in which the characteristics of such a swivel joint are found necessary or desirable. Thus this invention is not to be limited to its application to lamp fixture alone, but is to be considered applicable to any situation where there is to be frictionally restricted relative motion between two parts.

The lamp 10 includes a base 14 having a lower joint 16 and an arm assembly comprising a first element such as rod 18 pivotally rotatable relative to the lower joint 16, and a second element such as rod 20 rotatable relative to the first rod 18 by means of the swivel joint 12. A light fixture 22 is secured to the opposite end of the second rod 20.

In operation it is desirable that the user of the light fixture 10 be able to position the light fixture 22 virtually anywhere above or below the surface of the desk or table upon which the lamp rests. Such adjustability is accomplished through the pivotal arrangement of the first rod 18 within the lower joint 16, and the pivotal arrangement between the first and second rods 18 and 20 through the swivel joint 12. Additionally, the fixture 22 may rotate on a universal joint at the end of the rod 20. The problem solved by the instant invention relates specifically to the swivel joint 12 and as noted before reduces the size, weight and cost of such swivel joints while at the same time increasing the weight of the loaded moment arm 20, 22 which can be supported by the swivel joint 12 without slippage. As noted above, the principles of the instant invention could easily be applied to the lower swivel joint 16 as well as to the joint between the fixture 22 and the pipe 20.

As seen most clearly in FIGURE 2, the swivel joint 12 includes a first, central member 24, conveniently designated a ball-head and neck member, which may be thought as having two parts integrally joined; that is, a ball-head 26 and neck portion 28. (See FIGURES 6 and 7 for the plan views taken along the arrows 6—6 and 7—7 of FIGURE 2.) As noted, the ball-head and neck member 24 is an integral member preferably cast of suitable metal.

The ball-head portion 26 includes on a first side thereof a frusto-conically shaped protrusion 30 defined by the tapered exterior surface 32 and a flat surface 34 provided with an aperture 36 therethrough. A stop member 38 is positioned on the flat surface 34 for purposes to be described.

The internally tapered surface 39 of the protrusion 30 cooperates with the undersurface 40 of the flat surface 34 to define a recess disposed internally, so to speak, of the ball-head portion 26 of the ball-head and neck member 24 to receive a biasing spring 42 in a manner to be further described. The recess 44 thus far defined by the interior surfaces 39 and 40 terminates at its opposite end in a cylindrically walled surface 46 which includes a pair of oppositely disposed notches 48 therein (see FIGURE 7). As will be further described, a conically tapered bearing member 50, which includes a pair of laterally extending ears 52, is biased against the spring 42 such that the ears 52 are received within the notches 48 to thereby prevent relative rotation between bearing member 50 and the protrusion 30.

The neck portion 28 of the ball-head and neck member 24 terminates in a cylindrical pipe receiving receptacle 54 into which one end of the pipe 20 may be inserted and rigidly maintained (see FIGURE 4). Preferably, although in no way intended to be limited to such disclosure, the cylindrical receptacle 54 of the neck portion 28 includes a pair of oppositely disposed externally projecting protrusions 56 which cooperate with a pair of matched apertures 57 provided in the end of the pipe 20 in the following manner. During assembly, the pipe 20 is forcibly inserted in receptacle 54 until the apertures 57 are aligned with projections 56 and then the projections are forced under pressure toward each other and into the apertures 57 to assure a rigid connection between pipe 20 and ball-head and neck member 24. As can be seen in FIGURE 2, the provision of mating protrusions and apertures provides a smooth, clean exterior finish which is pleasing to the eye while at the same time provides a strong mechanical connection.

Disposed on the same side of the ball-head and neck member 24 as the protrusion 30 is a first shell-like member 58 which includes a generally hollow, spherical portion 60 and an integral extending semi-cylindrical neck portion 62. As seen most clearly in FIGURES 2 and 5, the first shell-like member 58 includes an internally disposed cavity 64, the interior surface 66 of which is cylindrically tapered in the same direction as the tapered surface 32 of the protrusion 30. As will be further described, the cavity 64 receives the protrusion 30 such that their respective tapered surfaces 66 and 32 engage one another to develop high frictional forces therebetween. The spherical portion 60 of the shell-like member 58 further includes an internally threaded recess 68 which receives the screw-threaded portion 70 of a fastening element 72, in a manner to be further described.

As seen in FIGURE 5, the undersurface of the spherical portion 60 of the shell-like member 58 includes an integrally depending stop web 78 which blockingly cooperates with the upstanding stop member 38, to limit the relative rotation between the shell-like member 58 and the ball-head and neck member 24 to 180°. It is to be understood that the stop arrangement provided between protrusion 38 and stop web 78 may be eliminated if it is desirable that the relative rotation between members 58 and 24 be increased. As shown in FIGURE 2, the semi-cylindrical neck portion 62 of shell-like member 58 includes an internally disposed finger 74 which slips within a slot 76 provided in one end of the pipe 18 to provide a rigid connection between the pipe 18 and the shell-like member 58, in a manner to be further described.

As noted previously, disposed on the opposite side of the ball-head and neck member 24 is the biasing spring 42 and a truncated conically shaped bearing member 50. Bearing member 50 includes the outstanding ears 52, a seating surface 80, and a seating projection 82 which fits within the helical spring 42 when the bearing member 50 is compressed against such spring. Bearing member 50 further includes an aperture 84 through which the fastening element 72 may pass in securing the entire arrangement in a manner which will be further described. Bearing member 50 is conically shaped and includes an external tapered bearing surface 86 which frictionally engages the internally tapered bearing surface 88 of a cavity 90 integrally disposed within a second shell-like member 92.

The second shell-like member 92 includes a spherical portion 94, similar to the spherical portion 60 of the first shell-like member 58, and a semi-cylindrical neck portion 96 similar to the semi-cylindrical neck portion 62 of the first shell-like member 58. The spherical portion 94 houses the cavity 90 and includes an aperture 98 through which the fastening element 72 may pass. The semi-cylindrical neck portion 96 includes an internally disposed ear 100 which cooperates with the slot 102 provided in the pipe 18.

As seen most clearly in FIGURE 2, the fastening element 72 includes a smooth rod-like portion 104 which terminates in a step-down shoulder 106 from which the threaded portion 70 extends. As seen most clearly in FIGURE 4, and as will be further described, the step-down shoulder 106 abuts the lower end 108 of the internally threaded screw portion receiving recess 68 provided within the shell-like member 58. It will be appreciated that the fastening element 72 has been shown as including a screw-threaded portion for the sake of illustration only, and as an alternative embodiment might comprise a permanent rivet, or equivalent fastening means, which passes completely through the shell-like member 58.

In assembling an arm unit which is to include the swivel joint 12 and the pipes 18 and 20, the pipe 20 is inserted within the pipe receiving receptacle 54 provided on the neck portion 28 of the ball-head and neck member 24. As noted previously, the exterior surface of the pipe receiving receptacle 54 may be provided with a pair of protrusions 56 which are lockingly urged into matched apertures 57 provided on the pipe 20 to securely fix the pipe 20 relative to the ball-head and neck member 24.

Next, the first shell-like member 58 is seated on the ball-head portion 26 of the ball-head and neck member 24 such that the protrusion 30 is seated within the cavity 64 and such that the internally threaded recess 68 of the shell-like member 58 passes through the aperture 36 provided on the upper surface 34 of protrusion 30 (see FIGURE 4). At this point it will be apparent that there will be frictional engagement between the mating tapered surfaces 32 and 66 of the protrusion 30 and cavity 64, respectively, with virtually the entire cross-sectional areas of such mating tapered surfaces being in face-to-face contact.

At this time the pipe 18 may be held at a slight angle such that the ear 74 integrally provided on the interior surface of the neck portion 62 of the first shell-like member 58 may be slipped into the slot 76 of the pipe 18. By moving the pipe 18 toward the ball-head and neck member 24, the ear 74 will interlockingly slide beneath the pipe surface 108 immediately adjacent the slot 76 and consequently the pipe 18 and shell-like member 58 will be securely maintained with respect to one another.

The spring 42 is then seated within the recess 44 defined by the interior surfaces 39 and 40 of the protrusion 30 as well as by the cylindrically walled surface 46, with one end 110 of the spring 42 being seated on the undersurface 40 of the protrusion 30. The conically shaped bearing member 50 is then seated at the opposite end of the spring 42 with the seating projection 82 fitting within the coil of the spring and the outstanding ears 52 seated within the notches 48 provided in the walled surface 46 to prevent relative rotation between the bearing member 50 and the protrusion 30.

Finally, the second shell-like member 92 is seated by first inserting the internally disposed ear 100 within the slot 102 of the pipe 18. The shell-like member 92 and pipe 18 are then moved relative to one another until the ear 100 is slidingly locked under the surface 112 adjoining the slot 102 in a manner similar to the cooperation between the ear 74 and the surface 108. At the same time, the second shell-like member 92 is seated on the bearing member 50 such that the tapered exterior surface 86 thereof telescopes within the cavity 90. As was the case with tapered surfaces 32 and 66 of the protrusion 30 and cavity 64, the tapered bearing surface 86 of the bearing member 50 and the internally tapered surface 88 of the cavity 90 are frictionally engaged such that virtually their entire cross-secitonal area frictionally oppose relative rotation therebetween.

As the final step in the assembly, the fastening element 72 is passed through the aperture 98 in the shell-like member 92; through the passageway 84 in the bearing member 50; through the coil spring 42; and into the internally screw-threaded receptacle 68 which, as noted before, has been seated within the recess 44 through the aperture 36 provided in their upper surface 34 of the protrusion 30.

As the fastening element 72 is rotated, the shell-like members 58 and 92 are drawn toward one another in sandwiched arrangement about ball-head portion 26 of member 24, against the bias of the spring 42 such that the two pairs of mating tapered surfaces (that is, the externally tapered surface 32 seated within the cavity 64; and the tapered surface 86 of the bearing member 50 within the cavity 90) are drawn into tight frictional engagement to oppose rotational movement between the shell-like members 58 and 92 and the ball-head and neck member 24 which, for the purpose of analyzing rotational movement, can be considered to include the bearing member 50 (since the ears 52 can only move longitudinally within the notches 48).

As noted previously, because the two pairs of mating surfaces are tapered they present large external and internal areas, respectively, to one another, and the frictional forces developed are much higher than the forces developed in the prior art swivel joints. Consequently the instant invention allows the moment arm, comprising the pipe 20 and relatively heavy lamp fixture 22, to be heavier and/or longer than was possible in the prior art.

It should be pointed out that the relative lengths of the rod-like portion 104 of the fastening element 72, and the internally threaded recess 68, define the extent to which the fastening element 72 may be tightened; for as may be seen in FIGURE 4, when the shoulder surface 106 of the fastening element 72 abuts the lower end 108 of the receptatcle 68, further rotation of the fastening element 72 is prevented.

It may be appreciated that the rod-like portion 104 of the fastening element 72, together with the smooth exterior surface of the internally threaded recess 68 define the axis about which the ball-head and neck member 24 rotates relative to the two shell-like members 58 and 92. It will also be appreciated that the compression spring 42 is concentrically disposed about such axis, conveniently designated as $C_L$ (center-line) in FIGURE 4 such that the forces which are developed by such compression spring in urging the protrusion 30 and bearing member 50 in opposite directions into their respective cavities 64 and 90, are developed exclusively parallel to the center line to effectuate maximum frictional engagement between the respective pairs of mating surfaces. This is to be contrasted with swivel joints of the prior art wherein the various biasing means utilized to generate frictional forces are disposed in less efficient locations.

It should be further pointed out that beside performing the dual function of urging the shell-like members 58 and 92 toward one another against the bias of spring 42, and also acting as an axis for relative rotation between the ball-head and neck member 24, and the shell-like members 58 and 92; the centrally disposed fastening element 72 performs a third function in that it cooperates with the ears 74 and 100 (through the pipe 18), to secure the shell-like members 58 and 92 to one another and prevent relative rotation therebetween.

As a final note, and as can be most clearly seen in FIGURE 7, the ball-head and neck member 24 includes a passageway 112 communicating with an internal cavity 114 which surrounds the cylindrically walled surface 46 of the biasing spring receiving recess 44. The passageway 112 permits the cable 116 to be passed from the fixture 22 into the recess 114 and through the pipe 18 to the source of current.

Thus there has been described a completely self-contained swivel joint which does not depend upon rods, springs or other devices to act upon other components remotely located from the actual axis of rotation. In contradistinction thereto, the friction forces developed within the instant invention are generated by one single spring concentrically disposed about the pivot axis of the swivel joint and all forces are directly applied to opposing pairs of mating tapered surfaces. By its very nature, the swivel joint of the instant invention allows for quick and easy assembly and represents a material cost savings by virtue of the few parts which it comprises. Mechanically, the swivel joint is of superior construction and facilitates the use of simple, easy to manufacture parts such as castings and springs, and works effortlessly with unequalled holding power thus permitting the size and weight of the fixtures which it supports to be increased. By its very reduction in overall size, there is a substantial reduction in weight, which necessarily decreases the holding power necessary in the lower joint 16, illustrated in FIGURE 1. To emphasize the simplicity of the invention, it is noted that arm assemblies which would include pipes 18 and 20 may now be manufactured at a tremendously higher rate than the swivel joint and arm unit which the instant invention replaces.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A swivel joint for permitting selective swivel type angular movement between first and second elements about a common axis:

a first member fixed to said first element having opposed first and second sides along the direction of said common axis;

a protrusion extending from said first side and having a first exteriorly disposed frictional surface symmetrically disposed about said common axis;

a bearing member extending from said second side and having a second exteriorly disposed frictional surface symmetrically disposed about said common axis;

biasing means located along said common axis, intermediate said protrusion and bearing member for developing a force parallel to said common axis for urging said first and second exteriorly disposed frictional surfaces apart, along the direction of said common axis;

second and third members fixed to said second element, and including first and second frictional cavity surfaces, respectively, located to cooperatively receive said first and second exteriorly disposed frictional surfaces;

and fastening means for securing said second and third members to said first member;

said biasing means forcing said cooperatively received frictional surfaces into firm engagement to frictionally maintain a selected angular relationship between said first and second elements;

said bearing member, and said protrusion including aligned apertures passing therethrough, said apertures being concentric with said common axis; said fastening means passing through said apertures and into securing engagement with said second and third members to urge said second and third members against the bias of said biasing means, whereby said fastening means acts as the axle of rotation for said second and third members relative to said first member, and said protrusion and bearing member are urged into firm frictional engagement with their respective cavities.

2. The swivel joint of claim 1, wherein said first and second exteriorly disposed frictional surfaces of said protrusion and said bearing member include frusto-conical surfaces, and their cooperating respective first and second frictional cavity surfaces include frusto-conical inner surfaces to assure maximum surface engagement between the respective pairs of frictionally engaged surfaces.

3. The swivel joint of claim 1, wherein said first member and said bearing member include cooperating interlock means for preventing relative rotational motion therebetween about said common axis.

4. The swivel joint of claim 1, wherein said first member includes an internally disposed recess which receives said biasing means, said recess terminates at one end thereof in a seating surface for one end of said biasing means, and including at the other end thereof a walled surface having a notch therein; and said bearing member includes an integral ear which seats in said notch to prevent relative rotational movement between said bearing member and said first member about said common xis.

5. The swivel joint of claim 1, wherein said fastening means comprises a rod-like member having a shoulder surface spaced at a predetermined point along the length thereof, and including an externally screw-threaded portion integrally extending from said shoulder surface; said second member including an internally threaded receptacle of predetermined length which threadably receives the screw-threaded portion of said rod-like member; said shoulder surface and said receptacle abutting one another when said screw-threaded portion is screwed into said receptacle to permit only a predetermined tightening therebetween.

6. The swivel joint of claim 1 wherein said second and third members include mating semi-cylindrical surfaces which define a rod receiving recess when said fastening means is passed through said apertures into engagement with said second and third members, each of said semi-cylindrical surfaces including inwardly directed tab portions which interlock with a rod which may be inserted in said rod receiving recess, to secure such rod to said second and third members while at the same time preventing relative rotational movement between said second and third members.

7. In an electrical fixture:
a first and second element and a swivel joint interconnecting said elements for selective relative movement therebetween about a common axis;
said swivel joint consisting solely of first, second and third members, a bearing member, a biasing means and a fastening member;
said first, second and third bearing members including aligned apertures along said common axis receiving said fastening means; said fastening means thereby defining the axle of rotation for the swivel type relative movement between said first and second elements;
said first member fixedly mounted to said first element, and said second and third members fixedly mounted to said second element;
said second and third members including complementary portions sandwiched about said first member;
a protrusion including a first frusto-conical surface extending outward from one side of said first member;
said bearing member extending outward along the opposed second side of said first member, and including a second frusto-conical surface;
said biasing means located internally of said first member, intermediate said first and second frusto-conical surfaces for urging said surfaces apart, along the direction of said common axis;
said second and third members including complementary frusto-conical surfaces in intimate frictional engagement with said first and second frusto-conical surfaces to provide restraining forces of sufficient magnitude for maintaining the selected angular relationships between said first and second elements;
said fastening means maintaining the sandwiched relationship of said second and third members about said first member, against the force of said biasing member.

8. In an electrical fixture as set forth in claim 7:
wherein said first member and said bearing member include cooperating interlock means for preventing relative rotational motion therebetween about said common axis.

9. In an electrical fixture as set forth in claim 7:
said biasing means concentrically disposed about said fastening means to develop a force parallel to said common axis against said complementary frusto-conical surfaces.

10. An assembly including first and second pipes, and a swivel joint connected between said first and second pipes to permit relative rotation therebetween, said swivel joint comprising:
a first member rigidly secured to said first pipe, said first member including frusto-conical protrusion integrally provided on one side thereof and an internally located recess defined by internal surfaces of said protrusion;
a second member secured to said second pipe, said second member having a frusto-conical internally disposed cavity which frictionally receives said frusto-conical protrusion;
spring means seated in said recess;
a bearing member positioned on the opposite side of said first member against said spring means including a frusto-conical surface;
a third member secured to said second pipe, said third member including a frusto-conical internally disposed cavity which frictionally receives the frusto-conical surface of said bearing member; and
fastening means freely passing through said bearing member, and said protrusion for urging said second and third members toward one another against the bias of said spring means to urge said protrusion and said bearing member into firm frictional engagement with the respective cavities of said second and third member, said frictional engagement being of sufficient magnitude to restrain the selected angular relationship between said first and second pipes.

References Cited

UNITED STATES PATENTS

| | | | |
|---|---|---|---|
| 167,948 | 9/1875 | Smith | 287—100 |
| 566,360 | 8/1896 | White | 287—92 X |
| 1,153,986 | 9/1915 | Whitney | 287—100 |
| 1,995,109 | 3/1935 | Smittle | 285—279 X |
| 2,024,930 | 12/1935 | Judell | 285—163 X |
| 2,477,762 | 8/1949 | Monroe | 285—269 X |
| 2,621,882 | 12/1952 | Fletcher | 287—14 |
| 2,694,585 | 11/1954 | Fiori | 287—14 |
| 3,204,990 | 9/1965 | Blakely | 285—279 X |

FOREIGN PATENTS 478,400  6/1929  Germany.

CARL W. TOMLIN, *Primary Examiner.*

D. W. AROLA, *Assistant Examiner.*